(12) United States Patent
Sreevalsan et al.

(10) Patent No.: US 12,206,587 B2
(45) Date of Patent: *Jan. 21, 2025

(54) SYSTEM AND METHOD FOR CLASSIFYING NETWORK TRAFFIC

(71) Applicant: Sandvine Corporation, Waterloo (CA)

(72) Inventors: Shyam Sreevalsan, Bengaluru (IN); Srinidhi Ramanujam, Bangalore (IN)

( * ) Notice: Subject to any disclaimer, the term of this patent is extended or adjusted under 35 U.S.C. 154(b) by 0 days.

This patent is subject to a terminal disclaimer.

(21) Appl. No.: 17/701,986

(22) Filed: Mar. 23, 2022

(65) Prior Publication Data

US 2022/0278934 A1 Sep. 1, 2022

Related U.S. Application Data

(63) Continuation of application No. 16/797,298, filed on Feb. 21, 2020, now Pat. No. 11,310,162.

(30) Foreign Application Priority Data

Feb. 22, 2019 (IN) .............................. 201911007013

(51) Int. Cl.
*H04L 47/2441* (2022.01)
*H04L 41/16* (2022.01)
(Continued)

(52) U.S. Cl.
CPC .......... *H04L 47/2441* (2013.01); *H04L 41/16* (2013.01); *H04L 47/22* (2013.01); *H04L 47/2483* (2013.01)

(58) Field of Classification Search
CPC ............................ H04L 47/2441; H04L 41/16
See application file for complete search history.

(56) References Cited

U.S. PATENT DOCUMENTS 7,664,048 B1* 2/2010 Yung .................... H04L 41/5022
709/224
7,778,194 B1* 8/2010 Yung ...................... H04L 43/00
709/224

(Continued)

OTHER PUBLICATIONS

European Patent Office, Examiners Report on corresponding EP Application No. 20159000.7, dated Jan. 31, 2022.

(Continued)

*Primary Examiner* — Adnan M Mirza
(74) *Attorney, Agent, or Firm* — Amarok IP Inc.; Neil W. Henderson (57) ABSTRACT

A system and method for classifying network traffic including: providing a framework of models configured to classify network traffic; determining, via a packet processing engine, whether the network traffic flow is encrypted; if the network traffic flow is encrypted: extracting, via the packet processing engine, encrypted flow attributes associated with a network traffic flow; deriving further flow attributes based on the extracted encrypted flow attributes; determining at least one model of the framework of models based on the derived flow attributes and extracted encrypted flow attributes; and classifying, via a traffic classification engine, the traffic flow as a category of traffic based on the at least one model; and if the network traffic flow is not encrypted: extracting non-encrypted flow attributes associated with a network traffic flow; classifying the traffic flow as a category of traffic based on the non-encrypted flow attributes.

11 Claims, 8 Drawing Sheets

(51) Int. Cl.
 *H04L 47/22* (2022.01)
 *H04L 47/2483* (2022.01)

(56) References Cited

U.S. PATENT DOCUMENTS

2010/0250918 A1  9/2010  Tremblay et al.
2017/0374016 A1  12/2017  Tirumaleswar et al.

OTHER PUBLICATIONS

European Patent Office, Extended European Search Report, corresponding EP Application No. 20159000.7, dated Jun. 9, 2020.
Shahbaz Rezaei et al, "Deep Learning for Encrypted Traffic Classification: An Overview", arxiv.org, Cornell University Library, 201 Olin Library Cornell University Ithaca, NY 14853, (Oct. 18, 2018), XP081123522.

* cited by examiner

SYSTEM AND METHOD FOR CLASSIFYING NETWORK TRAFFIC

RELATED APPLICATIONS

This application is a continuation of U.S. patent application Ser. No. 16/797,298 filed Feb. 21, 2020, which claims priority on Indian Patent Application No. 201911007013 filed Feb. 22, 2019, which are both incorporated herein in their entirety.

FIELD

The present disclosure relates generally to handling of computer network traffic. More particularly, the present disclosure relates to a system and method for classifying traffic and the handling of encrypted traffic.

BACKGROUND

Internet Data traffic continues to grow and is becoming increasingly encrypted in nature, with over 50% of internet traffic already encrypted and the number rising to 80% in some developed markets. Advanced encryption protocols such as TLS 1.3, Encrypted SNI and Encrypted DNS are either being adopted now or are likely to be widely adopted in the near future. At the same time, network operators continue to need to understand what applications and services are being transmitted over the network they operate in order to perform a variety of tasks, such as, but not limited, to ensuring quality of experience, congestion management, advanced data services and billing and charging related services including data fraud detection. In the face of increased encryption, accurately identifying the services in use is a challenge.

Meta data (data points) such as IP addresses, hostnames, SNI (Server Name Identification), SSL Certificate information, DNS records and HTTP User Agents are traditionally used to classify applications and services. With encrypted traffic, some or all of these data points may not be available.

Preserving network visibility has been identified by network operators as critical in evolving their infrastructure to next generation technologies. Without the right data to feed the decision making process, network operators will struggle to meet the conflicting demands of subscriber's expectations of network quality and the demands of financial markets to reduce CAPEX and OPEX.

As such, there is a need for an improved system and method for classifying network traffic.

The above information is presented only to assist with an understanding of the present disclosure. No determination has been made, and no assertion is made, as to whether any of the above might be applicable as prior art with regard to the present disclosure.

SUMMARY

In a first aspect, there is provided a system and method for classifying network traffic that includes encrypted data.

According to an aspect herein, there is provided a method for classifying network traffic including: providing a framework of models configured to classify network traffic; determining whether the network traffic flow is encrypted; if the network traffic flow is encrypted: extracting encrypted flow attributes associated with a network traffic flow; deriving further flow attributes based on the extracted encrypted flow attributes; determining at least one model of the framework of models based on the derived flow attributes and extracted encrypted flow attributes; and classifying the traffic flow as a category based on the at least one model; and if the network traffic flow is not encrypted: extracting non-encrypted flow attributes associated with a network traffic flow; classifying the traffic flow as a category of traffic based on the non-encrypted flow attributes.

In some cases, the classifying the traffic flow may include determining a type of service represented by the traffic flow. In this or other cases, the classifying the traffic flow may include determining at least one feature associated with the traffic flow.

In some cases, the method for classifying network traffic may further include: determining a confidence level of the classification of the traffic flow; comparing the confidence level with a predetermined threshold; if the confidence level is higher than the predetermined threshold, marking the flow as classified; and if the confidence level is lower than the predetermined threshold, determining whether any further model may be used to classify the traffic.

In some cases, the method for classifying network traffic may further include: determining an accuracy level for at least one model of the frameworks of models; comparing the accuracy level to a predetermined accuracy threshold; if the accuracy level is higher than the accuracy threshold, continue using the at least one model of the framework of models; otherwise, updating or removing the model from the framework of models.

In some cases, the network traffic flow categories may be selected from a group comprising: Web Browsing; Video Streaming; Bulk Data Transfer; Peer to Peer (P2P) Data Transfer; Virtual Private Networks (VPN); and Voice Over IP (VoIP).

In some cases, the method for classifying network traffic may further include: determining whether the category of the network traffic has a classifier or sub-classifier; if there a classifier or sub-classifier, determining the classifier or sub-classifier based on the derived and extracted flow categories; otherwise classifying the traffic as the category of network traffic.

According to another aspect herein, there is provided a system for classifying network traffic including: a framework of models configured to classify network traffic; a packet processing engine configured to determine whether the network traffic flow is encrypted; the packet processing engine further configured to extract encrypted flow attributes associated with a network traffic flow and deriving further flow attributes based on the extracted encrypted flow attributes if the network flow is encrypted and configured to extract non-encrypted flow attributes if the traffic flow is not encrypted; a traffic classification engine including: a deep classification engine configured to determine at least one model of the framework of models based on the derived and extracted flow attributes and classify the traffic flow based on the at least one model; and a signature classification engine configured to classify the traffic flow as a category of traffic based on the non-encrypted flow attributes.

In some cases, the classifying the traffic flow may include determining a type of service represented by the traffic flow. In this or other cases, the classifying the traffic flow may include determining at least one feature associated with the traffic flow.

In some cases, the deep classification engine is further configured to: determine a confidence level of the classification of the traffic flow; compare the confidence level with a predetermined threshold; if the confidence level is higher than the predetermined threshold, mark the flow as classified; and if the confidence level is lower than the predetermined threshold, determine whether any further model may be used to classify the traffic.

In some cases, the system for classifying network traffic may further include: a model monitoring module configured to: determine an accuracy level for at least one model of the frameworks of models; compare the accuracy level to a predetermined accuracy threshold; if the accuracy level is higher than the accuracy threshold, continue using the at least one model of the framework of models; otherwise, removing the model from the framework of models.

In some cases, the network traffic category may be selected from the group comprising: Web Browsing; Video Streaming; Bulk Data Transfer; Peer to Peer (P2P) Data Transfer; Virtual Private Networks (VPN); and Voice Over IP (VoIP).

In some cases, the traffic classification engine may be further configured to: determine whether the category of the network traffic has a classifier or sub-classifier; if there a classifier or sub-classifier, determine the classifier or sub-classifier based on the derived and extracted flow categories; otherwise classify the traffic as the category of network traffic.

According to another aspect herein, there is provided a method for building a framework of models for classifying network traffic, the method including: for each type of traffic flow to be classified: create a traffic flow with data labels; extract flow attributes associated with the traffic flow; derive flow attributes based on the extracted flow attributes; compare extracted flow attributes and derived flow attributes with the data labels; and determine a model for the traffic flow based on the compared flow attributes.

In some cases, the comparing the extracted flow attributes and derived flow attributes with the data labels may include: normalizing the flow attributes; aggregating the flow attributes; and deriving any additional data points required to perform the comparison.

In some cases, the method of building a framework of models may further include: reviewing the flow attributes associated with the model to determine any redundancy; removing redundant flow attributes; and removing highly correlated data points in the model.

In some further cases, the method of building a framework of models may further include: reviewing each model for each type of traffic flow to be classified; and determining whether the models are relatively proportioned for a plurality of services associated with each type of traffic flow.

Other aspects and features of the present disclosure will become apparent to those ordinarily skilled in the art upon review of the following description of specific embodiments in conjunction with the accompanying figures.

BRIEF DESCRIPTION OF FIGURES

Embodiments of the present disclosure will now be described, by way of example only, with reference to the attached Figures.

DETAILED DESCRIPTION

Generally, the present disclosure provides a method and system for classifying network traffic that includes encrypted data. The system may be initiated via a learning and initialization process. The system monitors network traffic. The system is intended to extract and derive traffic flow attributes that are intended to allow for the categorization and classification of the network traffic.

Internet service providers or Network Operators use the knowledge of what applications and services are delivered over the network they provide to effectively manage and operate the network. This information is used for a variety of use-cases such as but not limited to:

Capacity Planning;
Performance and Operational Monitoring;
User Behavior and Demographic Analysis;
Congestion Management;
Service Specific Charging;
Law Enforcement; and the like.

Encryption can be an important tool to help improve data security. Encryption may also maintain data integrity and protects user privacy.

Secure Socket Layer (SSL) and Transport Layer Security (TLS) are both cryptographic protocols that provide authentication and data encryption between servers, machines, and applications operating over a network. Over the years, new versions of the protocols have been released to address vulnerabilities and support stronger, more secure cipher suites and algorithms. The current standard of TLS 1.3 has several changes that improve performance and security. TLS 1.3 speeds up the time it takes to negotiate protocol versions, cipher suites, and authenticate the server. With TLS 1.3, all packets in the handshake after the initial client hello are intended to be encrypted. This includes the server certificates. The use of static RSA and Diffie-Hellman key exchange has been replaced with ephemeral mode Diffie-Hellman, thereby providing forward secrecy. The implication of this change is that passive mode decryption using the RSA key exchange may no longer be possible. These improved performance and increased security features make it preferable and provide motivation for applications to move to encryption, which will make traffic classification more difficult.

The next iteration of TLS is likely to include SNI (Server Host Name) encryption, the meta data fields traditionally used for SSL service classification may be unavailable. Other key network protocols such as Doman Name System (DNS) and Quick UDP Internet Connections (QUIC) are also either already encrypted or offer encrypted options.

End to end encryption has a severe impact on data traffic visibility for internet service providers and necessitates behavioral analysis as opposed to traditional methods of classification. Table 1 below illustrates various scenarios.

TABLE 1

The impact of increased encryption on classification methods

| Characteristic | Un-encrypted or partially encrypted | Fully end to end encrypted |
|---|---|---|
| Header information | Layer 7 information and metadata available to classify applications | Header information encrypted, not revealing application directly |

TABLE 1-continued

The impact of increased encryption on classification methods

| Characteristic | Un-encrypted or partially encrypted | Fully end to end encrypted |
| --- | --- | --- |
| Full Hostname/ URL available | "Site" signatures and full URL path available for classification. | Hostname or SNI not available for site-level classification |
| Net flow/IPfix Logging visibility | Traditional packet logging can reveal application or content accessed | Packet logging identifies traffic as TLS, HTTPS etc. and does not provide further visibility |
| Behavior analysis required | Only for certain applications (encrypted messaging, P2P) | For most applications (except CDN identifiable content) |

This problem of limited visibility into encrypted applications and services may be considered a roadblock for the internet service provider to effectively manage their network. It may also prevent service providers them from rolling out flexible and innovative service offerings for their subscribers and providing subscribers with an appropriate level of Quality of Experience (QoE).

Embodiments of the system and method detailed herein are intended to provide a solution that aims to accurately classify and sub-classify encrypted applications and services. This enables the internet service provider to effectively operate and manage their network while offering a high level of quality of experience and flexible offerings to their subscribers.

Conventional attempts at classifying encrypted traffic have often centered around the attempt to expose further information from the partially hidden or residual meta data in the packet headers. New developments in encryption (such as encrypted Server Name Indication (SNI) or 0-RTT) indicate that these approaches are not future proof. The system and method derived herein are not reliant on header meta data or other handshake information.

Prior solutions often make assumptions about the traffic patterns about different traffic applications and use statistical models to observe those differences.

Traditional traffic classification techniques used in network inspection equipment and in deep packet inspection systems tend to use IP address and port matching, HTTP header parsing and regex matching, SSL/TLS header parsing for SNI and certificate information, DNS and QUIC analysis for meta data and other similar techniques. These conventional techniques may be severely impacted by encryption. If the traffic is end to end encrypted and the DNS and SNI information is also encrypted then these techniques fail. These techniques are all susceptible to manipulation by services that engage in spoofing or masquerading, proxy servers and HTTP header injection can be used to mislead these traditional classification techniques. Spoofing or masquerading can occur when traffic attempts to resemble a traffic flow of a different category or service. If a service provider offers discounted cost for a particular service or category of traffic, subscribers may attempt to have other traffic spoof or masquerade as this discounted service or category. This behavior may cost the service provider money and does not allow the service provider to provide appropriate quality of service to all of the traffic flow.

Figure 1:
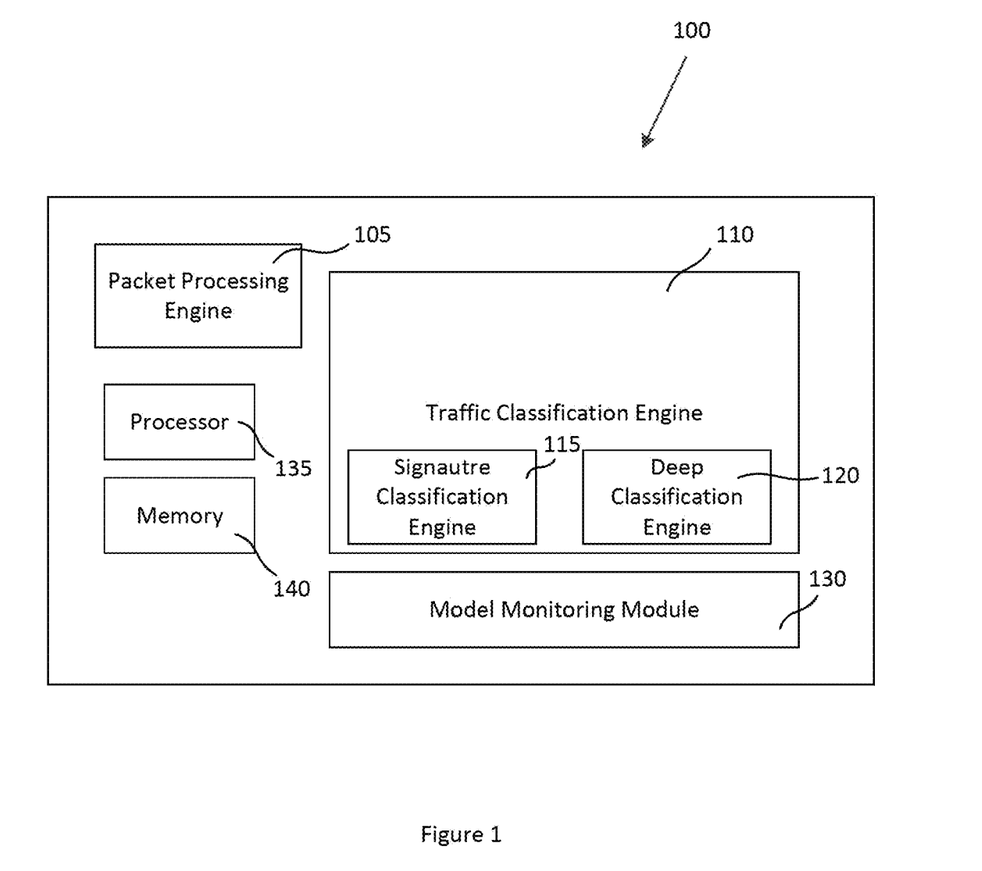
FIG. 1 illustrates a system for classifying encrypted data.

FIG. 1 illustrates a system 100 for classifying encrypted network traffic according to an embodiment. The system includes a packet processor engine 105, a traffic classification engine 110, a model monitoring module 130, a processor 135 and memory 140. In some cases, that the system may include a plurality of processors, including at least one processor per module or per engine. In some cases, the system may be distributed and may be housed in a plurality of network devices. In other cases, the system may reside in a single network device. In some cases, the memory 140 may be included as an internal component of the system. In other cases, the memory component may be housed externally or in a cloud and may be operatively connected to the system and the components of the system.

The packet processor engine 105 is intended to receive and review the traffic flow. In some cases, the packet processor engine 105 may include a deep packet inspection module. The packet processor engine may extract and derive flow attributes associated with the traffic flow as described in further detail herein. The packet processor engine 105 may further determine if the traffic is encrypted or non-encrypted.

The traffic classification module 110 may include a signature classification engine 115 and a deep classification engine 120. The signature classification engine 115 may be configured to categorize and classify non-encrypted traffic. The deep classification engine 120 may include a framework of models or may be operatively connected to a framework of models configured to categorize and classify encrypted traffic. The categorization and classification of the traffic is further detailed herein. Having the option to classify non-encrypted traffic via, for example, a signature classification engine 115, is intended to allow the traffic classification module to process traffic more efficiently than having all of the traffic reviewed by the deep classification engine 120.

The system may further include a model monitoring module 130. The model monitoring module 130 is configured to monitor the models used to categorize and classify the network traffic flow. If the models fall below a predetermined threshold, the model may be retrained or updated.

Embodiments of the system and method are intended to use flow behavioral attributes (both learned from the traffic on the wire, and derived by the system from the learned attributes) for classifying the data traffic—these attributes are not impacted by data encryption. A "flow" is defined as a set of packets between two endpoints (as defined by their source and destination attribute values and start and end times), and as bi-directional (the system effectively monitors two sub-flows, one in each direction). The flow attributes thus extracted are processed and used to train a network of multi-class and binary classification models that are used by the system to classify and sub-classify encrypted services. During deployment, the system uses the same attributes, which are automatically extracted and processed and used for real-time inference and classification. The framework of models includes a variety of models, each with its own distinct task and which may or may not interact with multiple other models in the framework. The system offers the operators (internet service providers) the flexibility to configure the network based on their use-cases and dimensioning requirements.

The embodiments of the system and method detailed herein are intended to be agnostic of the type of traffic and protocol in use. It works for TCP protocols as well as UDP protocols, new and yet to be standardized protocols such as TLS with Encrypted SNI are also supported for classification by the system. Different flavors of QUIC, Encrypted DNS traffic and other known methods of traffic encryption are also supported for classification. It is intended that the system may be updated on release or development of new protocol or encryption standards.

The system is capable of classifying traffic to a granular classification using the approach described herein a stand-alone classification system. For example, the system can classify, using attributes which are unaffected by known forms of encryption, not just a service such as Facebook, but also the various sub-classes such as Facebook Web Browsing, Facebook Video, Facebook Messaging and the like.

The framework of models used by the system is intended to address the problem of requiring the individual models to be unrealistically generic in nature while dealing with diverse types of traffic in a constantly evolving internet.

The framework of models also allows the system to scale and adapt in a manner that is quick and non-impactful to the overall system and network where the system is deployed. Each individual model in the network can be replaced without affecting the performance of the overall network.

The system is intended to have an extremely low false-positive rates that are comparable to unencrypted classification using traditional techniques. The use of true labelled data, robust supervised learning techniques and a high confidence threshold are intended to ensure that the system meets accuracy goals.

The system includes the traffic classification engine and the framework of classification models. The process of training these models, deploying and maintaining them for continued accuracy are detailed herein.

Figure 2:
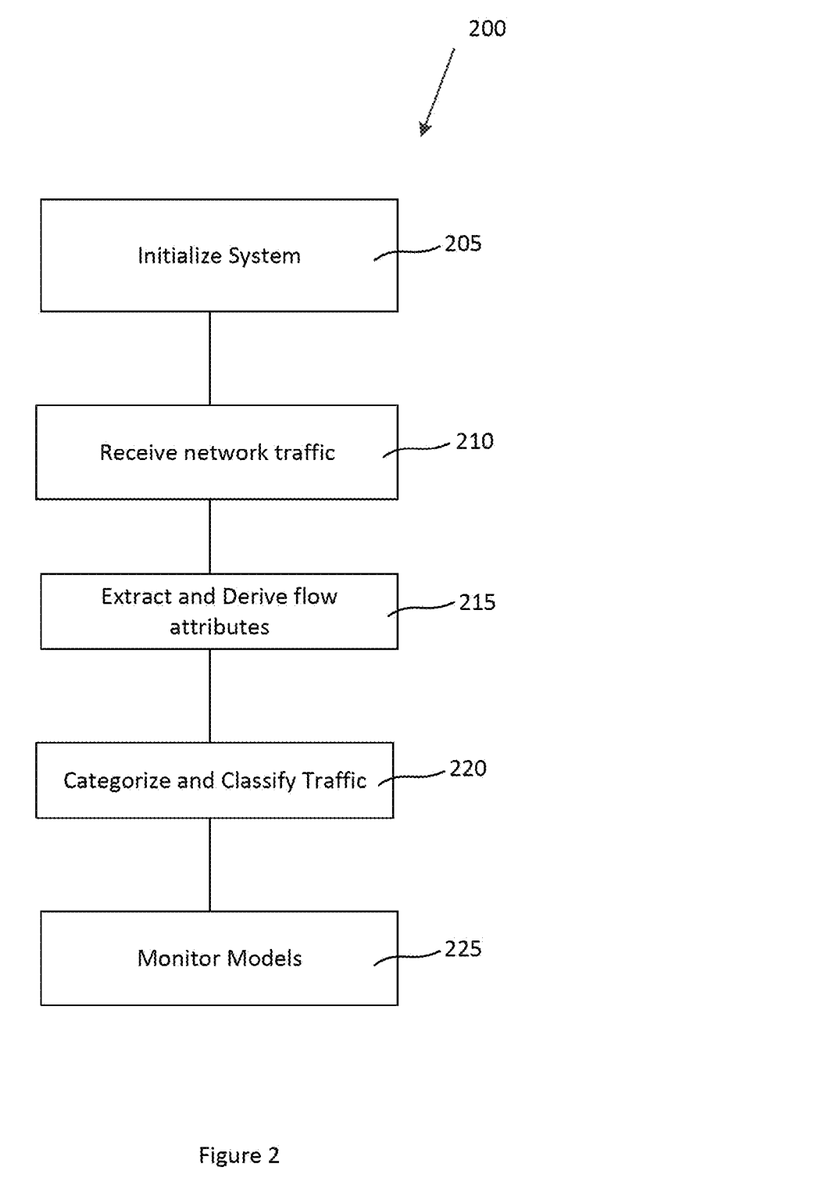
FIG. 2 illustrates a method for classifying encrypted data according to an embodiment.

FIG. 2 illustrates a method 200 to classify traffic according to an embodiment. The system is initialized, at 205 through a framework of models that are intended to have learned flow attributes as detailed herein. The system then receives and reviews network traffic flows, at 210, and determines if the traffic is encrypted. Flow attributes are derived and extracted from each network flow, at 215. The flow attributes are used by the system to categorize and classify encrypted traffic using the framework of models, at 220. The system monitors each model in the framework of models, at 225, in order to determine if a particular model needs to be updated or retrained.

Embodiments of the system for classifying network traffic, including encrypted flows, may include determining and maintaining the accuracy of the framework of models. In some cases, embodiments of the system may leverage the ability of an existing signature classification engine, which may use various methods of classification. For example, the classification abilities of an existing signature classification on unencrypted traffic or partially encrypted traffic may be used as a mechanism to generate labelled training data for the framework of models and also used for the validation of the trained models During the system initialization, the models are intended to be built from labeled data. During this process, the flow attributes and statistics that form the basis for the data used by the classification models, processing techniques are applied on this data and the process of model training through supervised learning is used. The result of this process is a plurality of classification models that form the framework of models that are deployed as part of the system and used by the traffic classification engine 110.

A network traffic flow may be described as having the following properties:
  The flow occurs between two endpoints, specified as sets of attribute values in the meter's current rule set. A flow is identified by its set of endpoint attribute values.
  Each flow may also have values for computed attributes (for example, Class and Kind). These may be directly derived from the endpoint attribute values.
  A new flow is created when a packet is to be counted that does not match the computed attributes of an existing flow. A meter may record the time when this new flow is created, and the age of the flow may be used as input for derived flow attributes.
  Computed attribute values may be set when the meter sees the first packet for the flow, and are not changed.
  Each flow may have two packet counters and two byte counters, one for each flow direction (Forward and Backward). These are updated as packets for the flow are exchanged.
  The computed attributes may have similar meaning for a variety of protocols (for example, TCP, UDP and others).
  Flow attributes may be either static or continuously updated counters over the lifetime of the flow. Flow attributes are not reset.

Embodiments of the system and method disclosed herein use extracted or derived Flow Attributes and a set of derived attributes that are derived from the interrelation of the Flow Attributes to each other as well as to other attributes of the network and other environmental factors. The derived attributes (sometimes referred to as computed attributes) offer a way to infer flow properties that are not altered by the time at which the flow measurement was taken (in other words, the derived attributes may not be coupled to the age of the flow) and when used in conjunction with other derived attributes and extracted flow attributes are intended to offer a highly accurate source of data which describes flow behavior in a statistically predictable and repeatable manner.

The total set of attributes available including the various derived attributes may number in the hundreds. Flow attribute measurements are made in both directions for bi-directional traffic flows.

The extracted attributes can be grouped or categorized into the following categories:
  Packet Length attributes
  Flow attributes related to packet length information including, for example, IP length related statistics and other parameters.
  TCP stack attributes
  Flow attributes related to TCP stack parameters. These attributes are only applicable for TCP traffic and include, for example, TOP Window Size statistics among other parameters.
  Activity related attributes
  Flow attributes related to how active or inactive a particular flow is, which may be measured in various ways. In some cases, activity may be measured via a bandwidth usage pattern of a flow. In an example, during a lifetime of a flow of 60 seconds, the first 10 seconds may include a lot of bytes usage while the remaining 50 seconds may have very little usage.
  Synchronization and consistency attributes
  Flow attributes related to synchronization, re-transmissions and fragmentation of packets belonging to a particular flow.
  Temporal attributes
  Flow attributes related to time, including statistics regarding the age of the flow, inter arrival time between packets of a flow and other temporal statistics.
  Usage attributes
  Flow attributes related to usage measured in bytes and packets. Different applications and services or types of application and services have been shown to have different usage patterns. For example, video streaming may consume a large amount of downstream bandwidth usage and little upstream bandwidth usage while Voice Over Internet Protocol (VOIP) may have similar usage in both the downstream and upstream directions).

The presence of available and accurate labelled data is used as an input into the supervised learning procedure. Labelled data may be collected through an automated system of test devices continuously generating labelled traffic for key applications and services. Further labelled data may be created through targeted manual testing and label generation for applications and services. It is intended that the labelled data is diverse and generic. The automatic label generation, which may be used in lab environments, is achieved by running system applications on the devices, for example, Android, IOS and Windows devices, that generate meta data based on the Layer 7 (L7) application or service in use and transmit this information as part of the traffic flow for the system to intercept and process.

Figure 3:
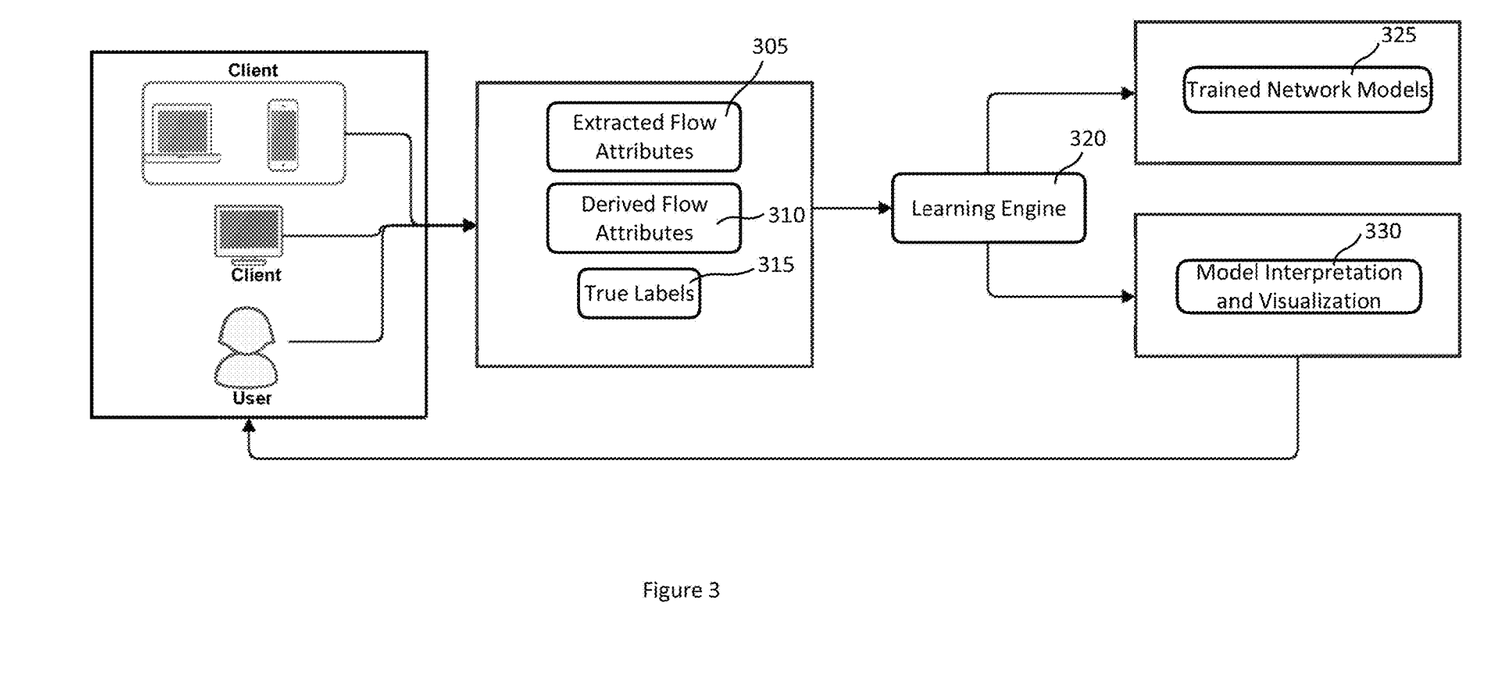
FIG. 3 illustrates a method for initializing a system for classifying encrypted data.

FIG. 3 illustrates an embodiment of a system and process used to generate labelled data. Known client equipment creates traffic flows. The system extracts, at 305, and derives, at 310, flow attributes associated with the traffic flow. The true labels, or known attributes are recorded, at 315. A learning engine 320 reviews the extracted and derived flow attributes in comparison to the true labels. A framework of models 325 is trained based on the different categories and classes of traffic flows and the data derived by the learning engine is further used to determine the interpretation and visualization of the models, at 330. The availability of high quality labelled data may be directly linked to the accuracy of the trained models. The combination of automated labelled data generation, which may be optimized for volume, and manual data generation, which may be optimized for variability, is intended to help create a large set of high quality data.

The extracted flow attributes and derived flow attribute values are then cleaned, processed and prepared for use by the learning engine. This may include imputing any missing or invalid attribute values with the appropriate replacements, ensuring the data is balanced, over-sampling or under-sampling as necessary and normalization and discretization as and when required. The attributes thus extracted and derived are intended to form the features that will be used by the system to classify encrypted services. Further details of the data processing pipeline, which describe the data preparation and modelling workflow, are illustrated in FIG. 4.

Figure 4:
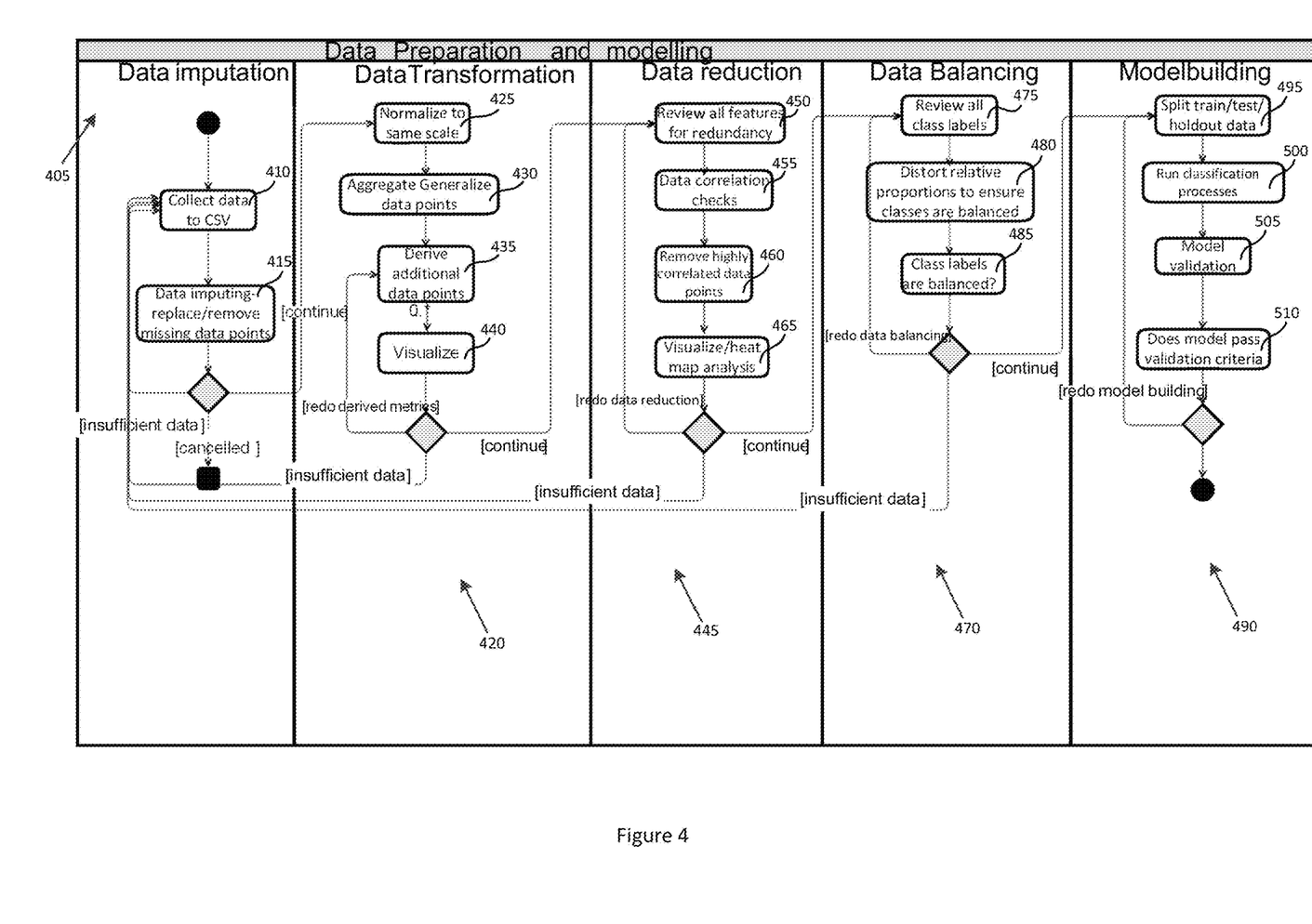
FIG. 4 illustrates data preparation and modelling according to an embodiment.

FIG. 4 illustrates an example of data preparation and modelling according to an embodiment. Data is imputed, at 405, which may include collecting data from various stored files, at 410 and replacing or removing any missing data points, at 415. The data may then be transformed, at 420, for example, the data may be normalized to the same scale, at 425. Data may be aggregated or generalized, at 430 in order to add further meaning and additional data points may be derived, at 435. Data may also be cleaned, for example by removing unnecessary data points or replacing missing data points with meaningful values. This is intended to allow the models to be visualized, at 440.

After the data has been transformed it may be reduced, at 445. The attributes may be reviewed for redundancy at 450, the correlations may be checked, at 455, and highly correlated data points may be reduced, at 460. The data may then be visualized and mapped and the mapping analyzed, at 465. The data may be balanced, at 470 where the class labels may be reviewed, at 475. The data may be balanced to distort relative proportions and then reviewed to determine whether the class labels are balanced, at 485. After the data is balanced, the models may be built, at 490. The data may be trained and tested at 495. The data may be reviewed and the classification models may be run, at 500 to verify their accuracy. Once verified and validated, at 505, it may be determined whether the models pass the validation criteria, at 510. If so, the models may be deployed. In some embodiments, the final trained models may be validated on 'hold out' data that the models have not been exposed to during the training process, the validation may also include data from diverse access network types such as fixed-line, satellite and wireless networks and different traffic conditions including shaping or limiting of traffic to certain fixed bandwidth rates.

The attributes thus extracted and derived are intended to form the features that will be used to train the multi-class and binary classification models that are used by the system to categorize, classify and sub-classify encrypted services. For real-time classification, the attributes may be extracted and derived in real-time and used by the system for inference and classification.

As mentioned previously, there may be hundreds of flow attributes that can be extracted and/or derived from each traffic flow but only a subset of these attributes may be used by each model of the framework of models. Each model in the network could use a different subset of these attributes.

During the learning phase, the attributes for each individual model are intended to be discovered using feature importance derived through the use of an ensemble of boosted trees or using recursive feature elimination. This may allow for the selection of key attributes and may help keep the models easier to interpret and maintain.

The method to be used by a particular model may also be discovered through an iterative selection process of a pre-selected shortlist of methods that have been shown to be historically accurate on the type of data that is used by the system. This shortlist may be an evolving list and periodically could have newer or more advanced methods or processes added to it in the future. Some of the methods which are part of the short list include: Decision Trees; Naïve Bayes; Tree Aided Bayesian Networks; Random Forest; eXtreme Gradient Boosting (XGBoost); Light GBM; Ada Boost; Neural Networks; Fuzzy Logic Inference and the like.

The iterative selection process described below is intended to discover the best suited process for each of the models that form the framework of models. The selected method or process are then fine-tuned by configuring their hyper-parameters optimally for each particular model and the classification problem it is trying to solve. A hyper-parameter is intended to be a configuration parameter that is external to the model and whose value is not able to be estimated or predicted solely based on the data. An example of a hyper-parameter may be the learning rate of a neural network.

Embodiments of the system includes a packet processing engine which is intended to provide for a network inspection or deep packet inspection system or the like which intersects traffic between the client (subscriber network) and server (internet). The packet processing engine in addition to packet processing is able to extract the flow attributes mentioned above as well as formulate various different derived attributes.

Figure 5:
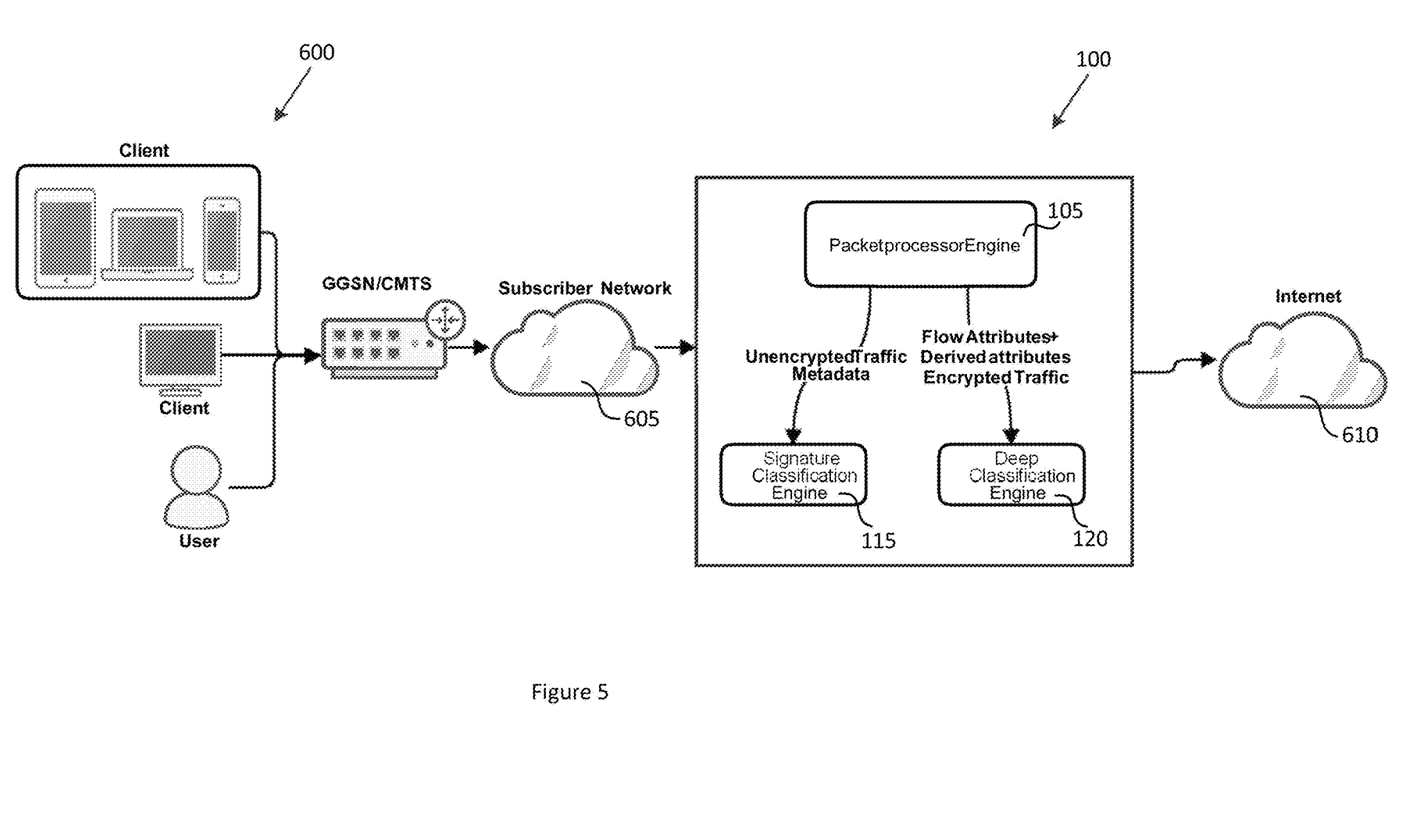
FIG. 5 illustrates the flow of information through a system for classifying encrypted data according to an embodiment.

FIG. 5 illustrates a high level view of an embodiment of the system 100 and its placement in a network. Subscribers or clients 600 access a subscriber network 605. The system is intended to be located either at the subscriber's network or between the subscriber's network and the internet 610. The traffic may be intercepted by the packet processor engine and then categorized and classified by the traffic classification engine. It will be understood that flow from the Internet will follow a similar (but backwards) path. It is intended that the system be able to see all of the traffic packets which form a particular flow in both an upstream and downstream location.

The system contains separate modules for packet processing and traffic classification, every packet that the system sees passes through the packet processor but may not necessarily be sent to the traffic classification engine It is intended that classification occurs at a flow level and that the traffic classification engine may not need to review every packet in a traffic flow in order to make a classification decision. The system may perform more efficiently and may be better able to scale if the traffic classification engine does not review each individual packet in a traffic flow. In a specific example, once a traffic flow is classified, the further packets associated with that flow may not be sent to the traffic classification engine.

The extracted and derived attributes are shared from the packet processor to the traffic classification module. In some cases, the attributes may be sent at fixed intervals. If the use-case of a particular model is one-time classification then the attributes may be transmitted once during the lifetime of a flow, if however, the use-case of a model is to repeatedly observe a flow and see if it changes its behavior then the attributes are repeatedly sent to the traffic classification module throughout the lifetime of the flow.

The traffic classification engine 110 may include the signature classification engine 115 and the deep classification engine 120. If the traffic is unencrypted or partially encrypted with enough meta data available to classify it using traditional techniques then the signature classification engine may be used. The deep classification engine may be invoked when the traffic is end to end encrypted, or when the operator considers it likely that there is spoofing or masquerading going on and would like to verify that the traffic is what it appears to be.

The framework of models that were previously trained are deployed and interact with the deep classification engine. The network is made up multiple layers and can be defined based on their function to consist of categorizers, classifiers and sub-classifiers.

A categorizer is a model which performs a high level classification or categorization of the traffic based on the traffic behavior. The categorizer is not intended to classify the exact service but the class of service in use. An example for a categorizer would be a model that categorizes encrypted VPN traffic. In some cases, all encrypted or obfuscated traffic flows that exhibit VPN behavior will be categorized as VPN by this model.

A classifier is a model that is intended to perform service classification and is invoked as a result of the categorizer's output. The classifiers run on a smaller, narrower subset of input data and hence can be more specialized in nature and be configured for greater accuracy at the cost to being less generalizable. An example for a classifier would be a model that classifies encrypted Netflix traffic. The input to this model may be video streaming traffic, a smaller subset thereof or similar traffic.

A sub-classifier is a model that performs sub-classification of traffic from a service based on the traffic's behavior. In some cases, a sub-classifier may classify various features of the data. Sub-classifiers can perform a variety of functions such as differentiating different service functions within an application or differentiating based on a dimension of the content being served. Some examples for sub-classifiers could include a model that can sub-classify Facebook traffic into Facebook Web and Facebook Video. Another example would be a model that can sub-classify YouTube video traffic into SD, HD and UHD.

The framework of models can have a plurality of categorizers, classifiers and sub-classifiers deployed at the same time working in association with each other. The output of a categorizer could be fed as input to a classifier, a sub-classifier OR another categorizer depending on the use-case. Similarly, the outputs of a classifier could be fed as input to another classifier or a sub-classifier or multiple sub-classifiers and so on. In an example, a traffic flow may be categorized as VPN traffic by one categorizer then be sent to a second categorizer to determine whether it is a business or residential VPN or a malicious VPN. It will be understood that there may be various levels of categorizations prior to being classified in a service.

Figure 6:
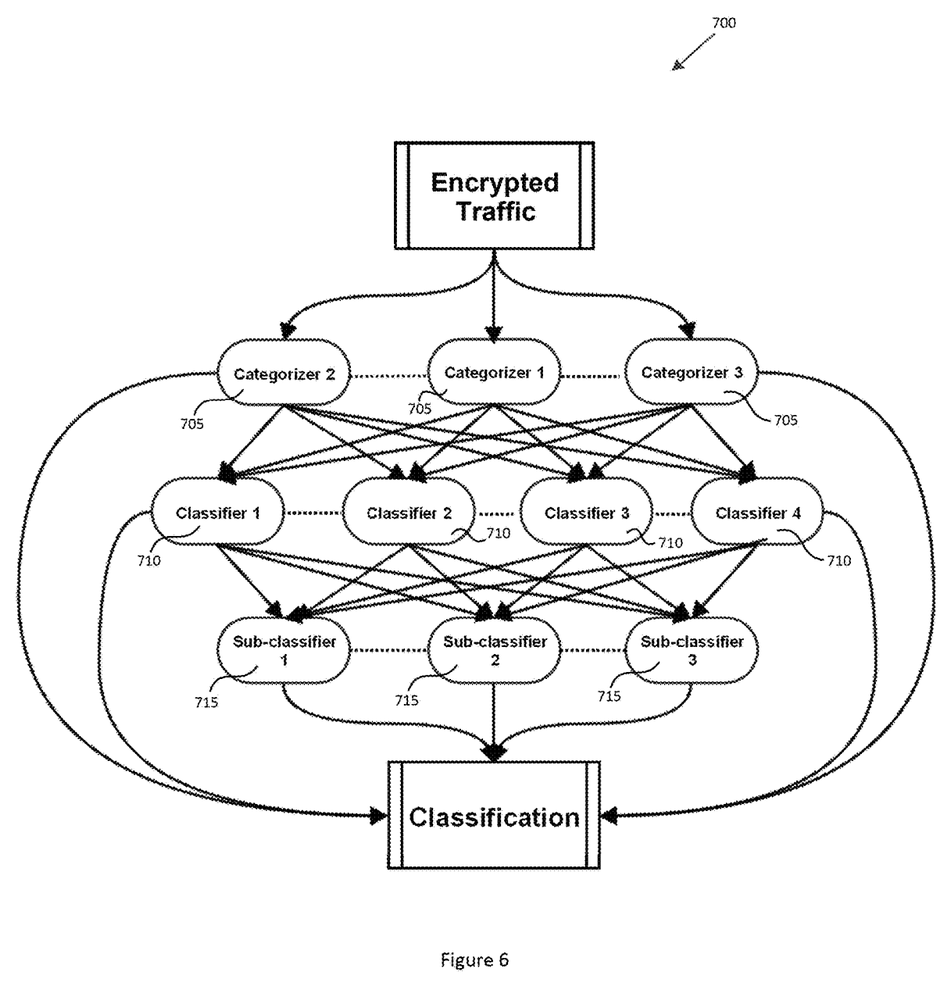
FIG. 6 illustrate a framework of models.

FIG. 6 represents a sample framework of models 700 with 3 categorizers 705, 4 classifiers 710 and 3 sub-classifiers 715 and depicts the possible flow of information between them. It will be understood that this is an example representation, the system may have up to a theoretical 'n' number of each of the layers and the upward scale is only limited by the physical dimensions of the hardware on which the system is deployed (in terms of CPU, processor and memory) as well as the constraints on the use-case which the operator of the system is attempting to execute.

Figure 7:
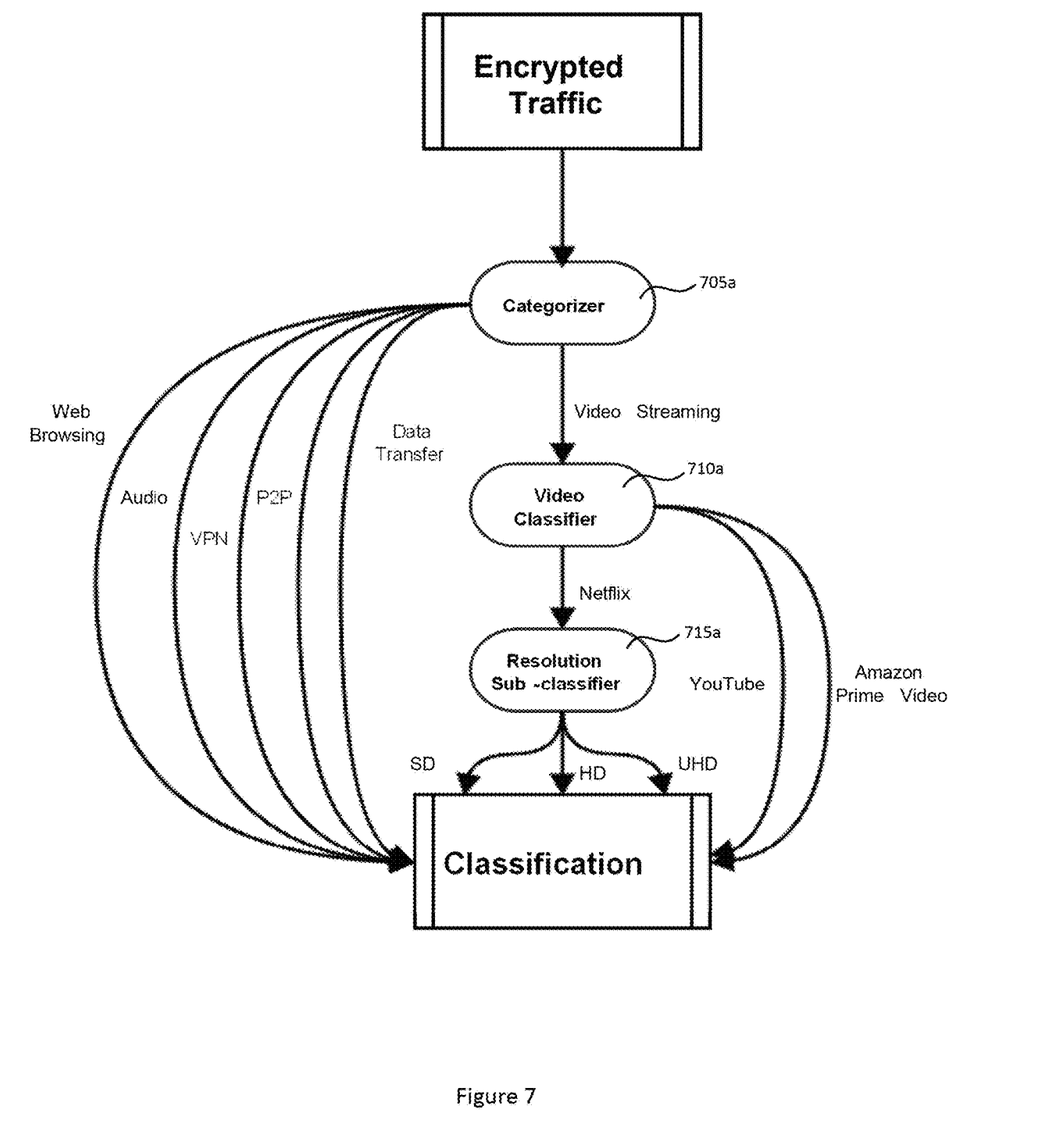
FIG. 7 illustrates a simplified flow through a framework of models according to an embodiment.

FIG. 7 illustrates an example where there is one categorizer 705a classifying encrypted traffic into five distinct categories. A classifier 710a takes the output of one of those categories as input and classifies it further into specific services. A sub-classifier 715a takes the output of one of the services and sub-classifies the traffic based on properties of the content or data that is being delivered.

The extracted and derived flow attributes (Fi) for unclassified encrypted traffic (Ti) is sent to the deep classification engine. The flow attributes may be forwarded to various relevant models or sequence of models within the framework of models. The relevant models may be based on an operator's configuration or goal for the configuration and/or the type of traffic. In an example, the operator may configure the system in order for the first model to be run as a general categorizer model for all encrypted traffic that classifies into VPN and Non-VPN traffic. A secondary model may be applied afterwards to categorize the non-VPN traffic into further sub-categories.

Each model generally has an independent mechanism of inference based on the pre-trained flow attributes, the inference when made also includes the confidence ($C_i$) expressed in percentage that the model has on that particular inference. Where 100% implies the model is completely sure of the inference based on its knowledge and anything lower implying that there are varying degrees of uncertainty.

Each model can have a predetermined threshold ($C_t$) which is decided based on the function of a particular model. When, $C_i >= C_t$, the inference is considered to be acceptable and the deep classification engine marks the flow with the classification label. When, $C_i < C_t$, the inference is considered unacceptable. The deep classification engine may determine if any other model is configured to inspect this particular flow, if yes then the same process is repeated on that particular flow. When no other models are configured to inspect the flow and all the models which have inspected have failed to have their inferences accepted the deep classification engine will mark the flow as unclassified. The predetermined threshold may range depending on the number of possible classes or labels there may be in the output. In a binary situation, (for example VPN or Non-VPN), the preferred range for Ct may be between 80% and 95% or some values within that range.

Each model within the framework of models may be deployed individually or collectively. In some cases, the model binary files contain the tree or network structure which may be generally light weight standalone files which are loaded as plug-ins on to the deep classification engine, these model binary files can also be hot-swapped without much impact to the system or network.

The monitoring module may exist under lab conditions as well as in network probes to identify if any of the models are dropping in effectiveness or accuracy, a histogram of model confidence may be used as an indicator of overall effectiveness. For example, if the $80^{th}$ percentile of the model confidence histogram drops below a certain predetermined threshold then the system may trigger a re-training action for the model. The predetermined threshold may depend on the number of classes or labels possible for the output. If the number of classes for the output is binary, the range for this threshold may be between 70 and 75%.

If an existing model is found to be requiring an update or re-training, the learning process may be repeated for that particular model with necessary changes in data collection, data processing, processing selection or training or the like. Once a new model is available and validated to be performing as required it may be plugged into the system replacing the older model. This activity is intended to have little impact to the overall framework of models.

Figure 8:
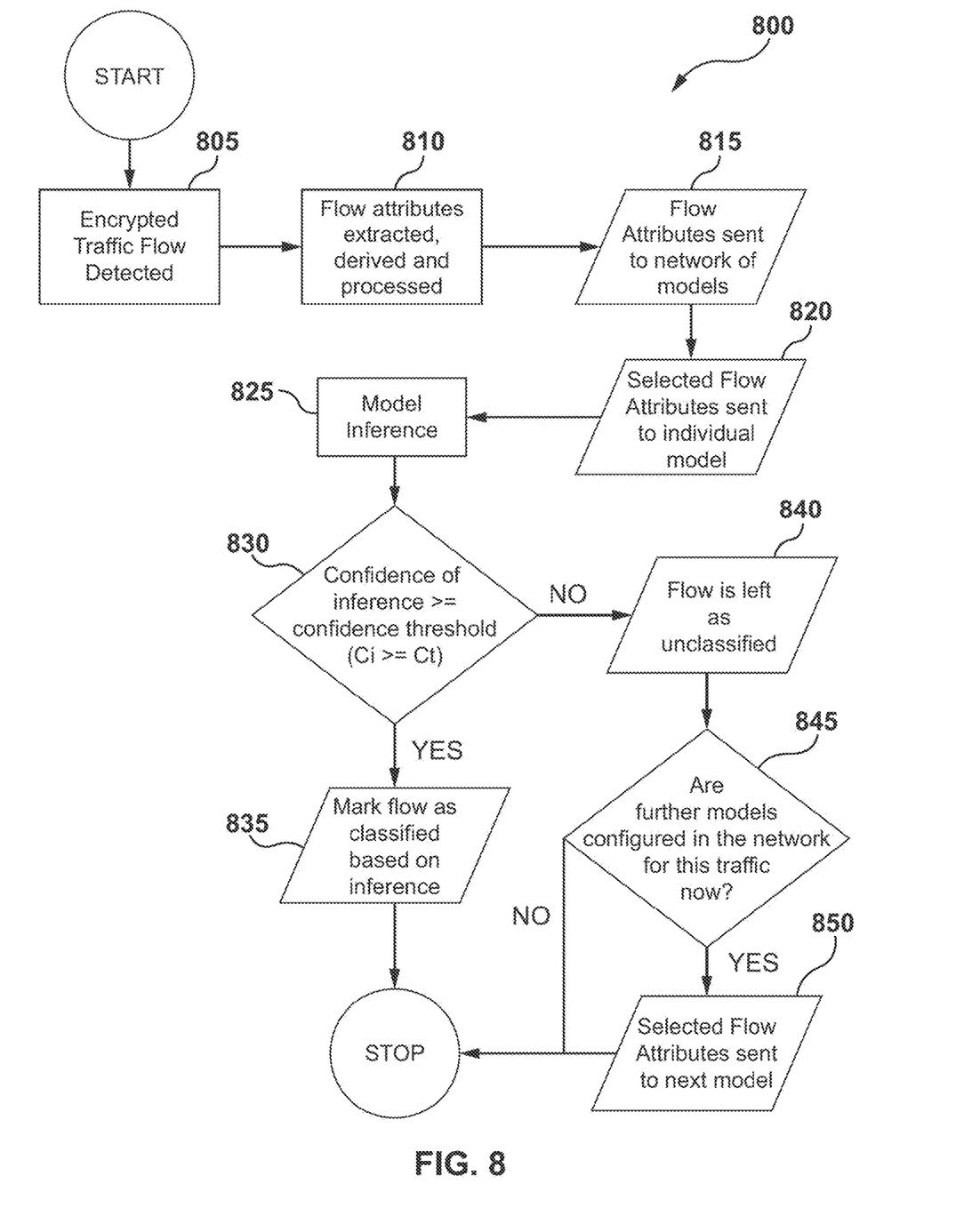
FIG. 8 illustrates a method for inference and classification according to an embodiment.

FIG. 8 illustrates a method 800 for classifying traffic according to an embodiment. The system 100 determines if there is an encrypted traffic flow, at 805. If the traffic flow is not encrypted it may be reviewed by the signature classification engine 115 using data accessible from the non-encrypted traffic flow. If the flow is encrypted, the deep classification engine 120, may determine flow attributes, at 810. The flow attributes are reviewed by the framework of models, at 815 wherein selected flow attributes may be sent to individual models within the framework, at 820. At 825, an inference regarding the traffic flow is determined. The confidence of the inference is determined and compared to a predetermined threshold, at 830. If the confidence of the inference is above the threshold, the flow is classified based on the inference, at 835. If the confidence of the inference is less than the threshold, the flow may be left unclassified, at 840. At 845, it is determined whether further models in the framework of models may be used to classify the flow. If so, the selected flow attributes may be sent to the next model, at 850, otherwise the flow may remain unclassified.

In the following example, one model is detailed. Each individual model may function similarly but may be potentially dissimilar in design and implementation. Each model is built using a potentially different base algorithm and also uses a different set of attributes or features.

This particular model, named categorizer A1 for simplicity, is a categorizer model and is used to broadly categorize traffic into discrete categories, lower level classifier models would use the information from this categorizer A1 to classify the traffic into services and applications. Categorizer A1 takes as its input unclassified encrypted traffic in the form of flow attributes that have been extracted or derived and classifies individual traffic flows into discrete categories.

The categorizer A1 may use XGBoost. XGBoost or "Extreme Gradient Boosting" is a gradient boosting library used for supervised learning problems. Categorizes A1 uses multiple attributes Fi to predict a target variable Yi.

The learning phase or training of categorizer A1 can be defined as the task of finding the best parameters e that best fit the training data Fi and labels Yi. To execute this training task, an objective function that consists of training loss and a regularization term is defined as:

$$obj(\theta)=L(\theta)+\Omega(\theta)$$

where L is the training loss function, and $\Omega$ is the regularization term.

The training loss measures how predictive categorizer A1 is with respect to the training data. The regularization term is intended to control complexity and prevent overfitting.

Flow attributes that are extracted or derived, in other words engineered features, represent the Fi that are used to predict the output, Yi, which consists of the different categories into which categorizer A1 can classify traffic.

In this example, Fi may include the following attributes or features:

F1=The minimum idle time seen by the flow during upload (measured in microseconds)
F2=The maximum idle time seen by the flow during upload (measured in microseconds)
F3=The maximum IP length seen by the flow during upload from the subscriber
F4=The minimum IP length seen by the flow during download from the internet
F5=The average IP length seen by the flow during upload from the subscriber
F6=The standard deviation of IP length seen by the flow during upload from the subscriber
F7=The minimum TCP window size seen by the flow during upload from the subscriber
F8=The average burst bytes seen by the flow during upload from the subscriber
F9=The minimum inter-arrival time seen by the flow during upload from the subscriber
F10=The minimum IP length seen by the flow during download from the internet
F11=The maximum IP length seen by the flow during download from the internet
F12=The average IP length seen by the flow during download from the internet
F13=The standard deviation of IP length seen by the flow during download from the internet
F14=The maximum TCP window size seen by the flow during download from the internet
F15=The maximum TCP window size seen by the flow during upload from the subscriber
F16=The minimum TCP window size seen by the flow during download from the internet
F17=The average burst bytes seen by the flow during download from the internet
F18=The minimum inter-arrival time seen by the flow during download from the internet
F19=The quotient of total bytes seen by the flow during upload from the subscriber, and the flow age
F20=The quotient of total bytes seen by the flow during download from the internet, and the flow age
F21=The quotient of the sum of packets with size between 1 byte-127 bytes seen by the flow during upload from the subscriber, and the flow age
F22=The quotient of the sum of packets with size between 1 byte-127 bytes seen by the flow during download from the internet, and the flow age
F23=The quotient of the sum of packets with size between 128 bytes-255 bytes seen by the flow during upload from the subscriber, and the flow age F24=The quotient of the sum of packets with size between 127 bytes-255 bytes seen by the flow during download from the internet, and the flow age It will be understood that further flow attributes may also be used.

Yi may include the following categories: Web Browsing; Video Streaming; Bulk Data Transfer; Peer to Peer (P2P) Data Transfer; Virtual Private Networks (VPN); Voice Over IP (VoIP). Other categories may be included depending on the operator's desire and the traffic previously modeled.

A grid search, measured by cross-validation for accuracy and correctness, is conducted for the optimal hyper-parameters to be used. A grid search is an approach to hyperparameter tuning that will methodically build and evaluate a model for each combination specified on the grid. At the end of the search the best combination may be identified. The trained categorizer A1 model is then validated on a hold-out dataset (Hi) which contains data that was not used during the earlier training and cross validation phases. Cross validation techniques may be used to measure any statistical bias introduced by the model and determine whether the model will perform as expected on previously unseen data points. The output may identify key parameters (sometimes referred to as hyper-parameters) that help in reducing model bias and overfitting. It will be understood that grid search is one of multiple techniques to implement cross validation and other techniques may be use.

The results on testing categorizer A1 on Hi is measured for accuracy and the model is deemed acceptable when the following condition is met:

Precision>=0.9 and Recall>=0.9

F1-score>=0.9

Before deployment, the confidence threshold (CO for this particular model is selected at Ct=90%. During operation, the confidence of inference (CO is measured for each flow of traffic inspected by the model and the flow is marked with the appropriate label from Yi if the following condition is satisfied: Ci>=Ct.

The constants may be defined as:

Ct: Confidence threshold which is constant per model

Yi: Labels into which the model classifies the flows that it sees as input

The variables may be defined as:

Ti: Input encrypted traffic to be classified

Hi: Hold-out data used for final model validation

The computed variables may be defined as:

Fi: Flow attributes extracted or derived from Ti

Ci: Confidence of a particular inference by a model

It is intended that the system and method disclosed herein have the ability to classify encrypted services purely based on flow attributes and without the need of any HTTP header information, IP Addresses, port information, SNI or DNS information. Further, the system and method are intended to provide the ability offered by the model network for users to choose level of classification, by defining which models are active at any time based on the use-case the operator wishes to deploy. For example: if the primary use-case is congestion management then it is possible that only the categorizers are required and the remaining models can be turned off to save on performance costs.

Embodiments of the system and method may also provide the ability to automatically select which classification technique is to be used depending on the kind of traffic that is being seen.

A very high level of accuracy in the inferences made by the model network for encrypted service classification, with false positive rates below 0.1% and accuracy rates of 90% and higher is intended to be achieved by embodiments of the system and method.

Further embodiments of the system and method are intended to provide the ability to easily extend the model network to cater to new services and other types of traffic in a manner that is low cost (in terms of time and man power) and with no service impact to the system (and network where the system is deployed).

By providing for categorization and classification of traffic, including encrypted traffic, the service provider may then amend or update the traffic flow path or policy applied to the traffic based on the category or class. In particular, a service provider may allow for greater bandwidth for an UHD video flow over a SD video flow. Further, the service provider may apply rules or policies associated with traffic shaping based on the categorized and classified flow that might not be applicable or appropriate without knowing the type of flow. If a new encrypted streaming video service is introduced, and the service provider has no way to identify the type of service, a first level classifier may be used to first categorize the traffic as streaming video. Subsequently the service provider may want to get a more granular level of visibility on the basis of the next level of classification. This second level of classification may be with respect to the application name, the resolution of the video or the like, based on which an action may be taken. For example, an action may be to prioritize high resolution video streaming.

In the preceding description, for purposes of explanation, numerous details are set forth in order to provide a thorough understanding of the embodiments. However, it will be apparent to one skilled in the art that these specific details may not be required. In other instances, well-known structures may be shown in block diagram form in order not to obscure the understanding. For example, specific details are not provided as to whether the embodiments or elements thereof described herein are implemented as a software routine, hardware circuit, firmware, or a combination thereof.

Embodiments of the disclosure or elements thereof may be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

What is claimed is:

1. A method for classifying network traffic comprising:
providing a framework of models configured to classify network traffic;
determining whether the network traffic flow is encrypted;
if the network traffic flow is encrypted:
extracting encrypted flow attributes associated with a network traffic flow;
deriving further flow attributes based on the extracted encrypted flow attributes and the interrelation of flow attributes to each other, wherein the derived flow attributes are not coupled to the age of the network traffic flow;
determining attributes of environmental factors associated with the traffic flow;
determining at least one model of the framework of models based on the derived flow attributes and extracted encrypted flow attributes and environmental factors;
classifying the traffic flow as a category of traffic based on the at least one model; and
if the network traffic flow is not encrypted:
extracting non-encrypted flow attributes associated with a network traffic flow;
classifying the traffic flow as a category of traffic based on the non-encrypted flow attributes.

2. A method for classifying network traffic according to claim 1, wherein classifying the traffic flow as a category of traffic comprises determining a type of service represented by the traffic flow or determining at least one feature associated with the traffic flow.

3. A method for classifying network traffic according to claim 1, further comprising:
determining a confidence level of the classification;
comparing the confidence level with a predetermined threshold;
if the confidence level is higher than the predetermined threshold, marking the flow as classified; and
if the confidence level is lower than the predetermined threshold, determining whether any further model may be used to classify the traffic.

4. A method for classifying network traffic according to claim 1, further comprising:
determining an accuracy level for at least one model of the frameworks of models;
comparing the accuracy level to a predetermined accuracy threshold;
if the accuracy level is higher than the accuracy threshold, continue using the at least one model of the framework of models;
otherwise, updating or removing the model from the framework of models.

5. A method for classifying network traffic according to claim 1, wherein the network traffic flow categories is selected from a group comprising: Web Browsing; Video Streaming; Bulk Data Transfer; Peer to Peer (P2P) Data Transfer; Virtual Private Networks (VPN); and Voice Over IP (VOIP).

6. A method for classifying network traffic according to claim 1, further comprising:
determining whether the category of the network traffic has a classifier or sub-classifier;
if there a classifier or sub-classifier, determining the classifier or sub-classifier based on the derived and extracted flow categories;
otherwise classifying the traffic as the category of network traffic.

7. A system for classifying network traffic comprising at least one processor configured to execute instructions stored in a memory component wherein the instructions provide for the following:
a framework of models configured to classify network traffic;
a packet processing engine configured to determine whether the network traffic flow is encrypted;
the packet processing engine further configured to extract encrypted flow attributes associated with a network traffic flow and deriving further flow attributes based on the extracted encrypted flow attributes and the interrelation of flow attributes to each other if the network flow is encrypted and configured to extract non-encrypted flow attributes if the traffic flow is not encrypted and determine attributes of environmental factors associated with the traffic flow other, wherein the derived flow attributes are not coupled to the age of the network traffic flow;
a traffic classification engine comprising:
a deep classification engine configured to determine at least one model of the framework of models based on the derived and extracted flow attributes and environmental factors, classify the traffic flow based on the at least one model; and
a signature classification engine configured to classify the traffic flow as a category of traffic based on the non-encrypted flow attributes.

8. A system for classifying network traffic according to claim 7, wherein classifying the traffic flow comprises determining a type of service represented by the traffic flow or determining at least one feature associated with the traffic flow.

9. A system for classifying network traffic according to claim 7, wherein the deep classification engine is further configured to:
determine a confidence level of the classification of the traffic flow;
compare the confidence level with a predetermined threshold;
if the confidence level is higher than the predetermined threshold, mark the flow as classified; and
if the confidence level is lower than the predetermined threshold, determine whether any further model may be used to classify the traffic.

10. A system for classifying network traffic according to claim 7, wherein the network traffic category is selected from the group comprising: Web Browsing; Video Streaming; Bulk Data Transfer; Peer to Peer (P2P) Data Transfer; Virtual Private Networks (VPN); and Voice Over IP (VOIP).

11. A system for classifying network traffic according to claim 7, wherein the traffic classification engine is further configured to:
determine whether the category of the network traffic has a classifier or sub-classifier;
if there a classifier or sub-classifier, determine the classifier or sub-classifier based on the derived and extracted flow categories;
otherwise classify the traffic as the category of network traffic.

* * * * *